(12) United States Patent
Eklund

(10) Patent No.: US 11,453,440 B2
(45) Date of Patent: Sep. 27, 2022

(54) SUBFRAME ASSEMBLY FOR A VEHICLE

(71) Applicant: Volvo Car Corporation, Gothenburg (SE)

(72) Inventor: Johan Eklund, Gothenburg (SE)

(73) Assignee: Volvo Car Corporation, Gothenburg (SE)

(*) Notice: Subject to any disclaimer, the term of this patent is extended or adjusted under 35 U.S.C. 154(b) by 317 days.

(21) Appl. No.: 16/822,090

(22) Filed: Mar. 18, 2020

(65) Prior Publication Data

US 2021/0291904 A1 Sep. 23, 2021

(51) Int. Cl.
| | |
|---|---|
| *B62D 21/03* | (2006.01) |
| *B62D 21/11* | (2006.01) |
| *B62D 21/09* | (2006.01) |
| *B62D 27/06* | (2006.01) |
| *B62D 21/15* | (2006.01) |

(52) U.S. Cl.
CPC ............ *B62D 21/03* (2013.01); *B62D 21/09* (2013.01); *B62D 21/11* (2013.01); *B62D 21/155* (2013.01); *B62D 27/06* (2013.01); *B60G 2206/604* (2013.01); *B60G 2206/606* (2013.01)

(58) Field of Classification Search
CPC ...... B62D 21/03; B62D 21/11; B62D 21/155; B62D 21/02; B62D 21/152; B62D 21/00; B62D 21/09; B62D 27/06; B62D 27/065; B62D 25/08; B62D 25/082; B62D 25/20; B62D 25/085; B62D 25/2018; B62D 25/2027; B62D 29/008; B60G 2204/15; B60G 2204/1222; B60G 2206/60; B60G 2206/601; B60G 2206/602; B60G 2206/604; B60G 2206/605; B60G 2206/606

USPC .................................. 280/124.11; 180/312
See application file for complete search history.

(56) References Cited

U.S. PATENT DOCUMENTS

| | | | |
|---|---|---|---|
| 9,352,785 B2 | 5/2016 | Winberg et al. | |
| 9,616,737 B2* | 4/2017 | Bourlon ............... | B60K 5/1241 |
| 10,086,873 B2 | 10/2018 | Chen et al. | |
| 10,118,649 B2 | 11/2018 | Isakiewitsch | |
| 2011/0308877 A1* | 12/2011 | Hiruma ..................... | B60K 5/12 |
| | | | 180/299 |
| 2020/0331535 A1* | 10/2020 | Hida ...................... | B62D 25/16 |

FOREIGN PATENT DOCUMENTS

| | | |
|---|---|---|
| JP | 4486396 B2 | 6/2010 |
| WO | 2012113433 A1 | 8/2012 |

* cited by examiner

*Primary Examiner* — Keith J Frisby
(74) *Attorney, Agent, or Firm* — Clements Bernard Walker; Christopher L. Bernard

(57) ABSTRACT

A subframe assembly adapted to receive and secure an engine or motor in a vehicle, the subframe assembly including: a crossmember; an arm member coupled to each end of the crossmember; and a corner member coupled to each arm member adjacent to a corresponding intersection with the crossmember, wherein each corner member includes an upwardly protruding shelf structure defining a plurality of threaded holes adapted to receive a plurality of attachment bolts for securing a corresponding engine mount or motor mount to the subframe assembly. Each corner member includes a horizontal arm disposed along an upper surface of the corresponding arm member and a vertical arm disposed along an outboard surface of the corresponding arm member, wherein the horizontal arm includes the upwardly protruding shelf structure.

18 Claims, 5 Drawing Sheets

SUBFRAME ASSEMBLY FOR A VEHICLE

TECHNICAL FIELD

The present disclosure relates generally to the automotive field, and especially the electric vehicle (EV) field. More particularly, the present disclosure relates to a subframe assembly (e.g., a front subframe assembly) for a vehicle that includes integrated shelf structures in corner extrusions (e.g., front corner extrusions) thereof, enabling engine mounts or motor mounts to be bolted to the subframe assembly from above during production while maintaining structural strength and overall vehicle integrity.

BACKGROUND

In some conventional internal combustion engine (ICE) vehicle and EV designs, the engine or motor is coupled to a front (or rear) subframe assembly that may be extruded for weight and costs savings, as well as structural strength and overall vehicle integrity in the event of a crash. Extruded aluminum provides many advantages over conventional steel box and/or cast constructions. This subframe assembly typically consists of a frame-like structure that includes at least one extruded crossmember (and likely a pair of extruded crossmembers) disposed between a pair of elongate extruded arm members. The engine or motor is secured to the subframe assembly via engine mounts or motor mounts that are secured in the corners of the subframe assembly. In the case of a front subframe assembly, the front engine mounts or motor mounts are secured to front corner members that are welded or otherwise affixed to the arm members near their intersections with the front crossmember, and/or to the arm members and front crossmember themselves. A similar arrangement can be used for the rear engine mounts or motor mounts, or with a rear subframe assembly.

Typically, the engine mounts or motor mounts are secured to the arm members and crossmember of the subframe assembly via bolts that pass at least partially through the arm members and crossmember, through oversized/threaded sleeves that protrude from the bottom surfaces of the arm members and crossmembers, and are secured from below. This introduces manufacturing complexity, tolerance and angle-mismatch problems, and is undesirable from an ergonomic standpoint. Longer bolts and sleeves further add material to the process. Alternatively, the engine mounts or motor mounts are secured to the corner members and arm members and crossmember of the subframe assembly via bolts that pass at least partially through the corner members and arm members and crossmember, through oversized/threaded sleeves that protrude from the top surfaces of the corner members and arm members and crossmembers, and are secured from above. Again, this introduces manufacturing complexity and tolerance and angle-mismatch problems. Sleeves further add material to the process.

The above-described background relating to engine mounts and motor mounts is merely intended to provide a contextual overview of some current issues and is not intended to be exhaustive. Other contextual information may become apparent to those of ordinary skill in the art upon review of the following description of exemplary embodiments.

SUMMARY

The present disclosure generally provides an assembly and method that allows the engine mounts or motor mounts of a vehicle to be assembled from above, providing ergonomic advantages, while eliminating the use of longer bolts and threaded sleeves to the extent possible. The use of extruded (aluminum) structures is provided herein to provide the desired ductility and crashworthiness.

In general, the present disclosure thus provides a subframe assembly that is adapted to receive and secure an engine or motor (i.e., a propulsion device) in a vehicle. The subframe assembly generally includes an extruded aluminum crossmember and an extruded aluminum arm member coupled to each end of the crossmember. An extruded aluminum corner member is coupled to each arm member adjacent to a corresponding intersection with the crossmember. Each corner member includes an upwardly protruding shelf structure itself defining a plurality of threaded holes adapted to receive a plurality of attachment bolts for securing the corresponding mount (e.g., engine mount or motor mount) to the subframe assembly. This shelf structure is a solid structure that is extruded with the remainder of the corner member, providing an integrated structure that avoids the brittleness problems associated with cast components and the failure problems associated with welded components. Each corner member includes a horizontal arm disposed along an upper surface of the corresponding arm member and a vertical arm disposed along an outboard surface of the corresponding arm member. The horizontal arm comprises the upwardly protruding shelf structure defining the plurality of threaded holes adapted to receive the plurality of attachment bolts for securing the corresponding engine mount or motor mount to the subframe assembly. The crossmember defines one or more additional threaded holes at each end adapted to receive a corresponding one or more additional attachment bolts for securing the corresponding engine mount or motor mount to the subframe assembly. Additional crossmembers may be utilized and, again, each of the crossmembers, arm members, and corner members may be extruded structures, with the uninterrupted length of the arm members being maximized. It should be noted that a front subframe assembly and front engine mounts or motor mounts are the general focus of the present disclosure, however the principles thereof apply equally to rear engine mounts or motor mounts and/or a rear subframe assembly, when applicable.

In one exemplary embodiment, the present disclosure provides a subframe assembly adapted to receive and secure an engine or a motor in a vehicle, the subframe assembly including: a crossmember; an arm member coupled to each end of the crossmember; and a corner member coupled to each arm member adjacent to a corresponding intersection with the crossmember, wherein each corner member includes an upwardly protruding shelf structure defining a plurality of threaded holes adapted to receive a plurality of attachment bolts for securing a corresponding engine mount or motor mount to the subframe assembly. Optionally, each corner member includes a horizontal arm disposed along an upper surface of the corresponding arm member and a vertical arm disposed along an outboard surface of the corresponding arm member, and wherein the horizontal arm includes the upwardly protruding shelf structure defining the plurality of threaded holes adapted to receive the plurality of attachment bolts for securing the corresponding engine mount or motor mount to the subframe assembly. Optionally, the crossmember defines one or more additional threaded holes at each end adapted to receive a corresponding one or more additional attachment bolts for securing the corresponding engine mount or motor mount to the subframe assembly. Optionally, the subframe assembly also includes an additional crossmember coupled between the arm members. Each of the arm members is an elongate extruded structure. Each of the corner members is also an extruded structure. When used, the horizontal arm and the vertical arm of each corner member are welded to the corresponding upper surface and outboard surface of the corresponding arm member, respectively. Alternatively, the horizontal arm and the vertical arm of each corner member are integrally formed with the corresponding upper surface and outboard surface of the corresponding arm member, respectively. Each corner member includes a horizontal planar member coupled to the corresponding vertical arm. Optionally, the horizontal planar member is coupled to the corresponding vertical arm by an intervening angled arm member.

In another exemplary embodiment, the present disclosure provides a corner member for a subframe assembly including a crossmember and an arm member coupled to each end of the crossmember and adapted to receive and secure an engine or a motor in a vehicle, the corner member including: an upwardly protruding shelf structure defining a plurality of threaded holes adapted to receive a plurality of attachment bolts for securing a corresponding engine mount or motor mount to the subframe assembly. Optionally, the corner member also includes a horizontal arm adapted to be disposed along an upper surface of a corresponding arm member and a vertical arm adapted to be disposed along an outboard surface of the corresponding arm member, wherein the horizontal arm includes the upwardly protruding shelf structure defining the plurality of threaded holes adapted to receive the plurality of attachment bolts for securing the corresponding engine mount or motor mount to the subframe assembly. Optionally, the crossmember defines one or more additional threaded holes at each end adapted to receive a corresponding one or more additional attachment bolts for securing the corresponding engine mount or motor mount to the subframe assembly. Optionally, the subframe further includes an additional crossmember coupled between the arm members. Each of the arm members is an elongate extruded structure. The corner member is also an extruded structure. When used, the horizontal arm and the vertical arm are adapted to be welded to the corresponding upper surface and outboard surface of the corresponding arm member, respectively. Alternatively, the horizontal arm and the vertical arm are adapted to be integrally formed with the corresponding upper surface and outboard surface of the corresponding arm member, respectively. The corner member further includes a horizontal planar member coupled to the vertical arm. Optionally, the horizontal planar member is coupled to the vertical arm by an intervening angled arm member.

In a further exemplary embodiment, the present disclosure provides a vehicle, including: a propulsion device (i.e., an engine or a motor); a plurality of mounts (e.g., engine mounts or motor mounts) coupled to the engine or the motor; and a subframe assembly, including: a crossmember; an extruded arm member coupled to each end of the crossmember; and an extruded corner member coupled to each arm member adjacent to a corresponding intersection with the crossmember, wherein each corner member includes a horizontal arm disposed along an upper surface of the corresponding arm member and a vertical arm disposed along an outboard surface of the corresponding arm member, wherein the horizontal arm includes an upwardly protruding shelf structure defining a plurality of threaded holes adapted to receive a plurality of attachment bolts for securing a corresponding engine mount or motor mount to the subframe assembly, and wherein each corner member includes a horizontal planar member coupled to the corresponding vertical arm. Optionally, the crossmember defines one or more additional threaded holes at each end adapted to receive a corresponding one or more additional attachment bolts for securing the corresponding engine mount or motor mount to the subframe assembly.

BRIEF DESCRIPTION OF THE DRAWINGS

The present disclosure is illustrated and described herein with reference to the various drawings, in which like reference numbers are used to denote like assembly components/method steps, and in which.

DESCRIPTION OF EXEMPLARY EMBODIMENTS

Figure 1:
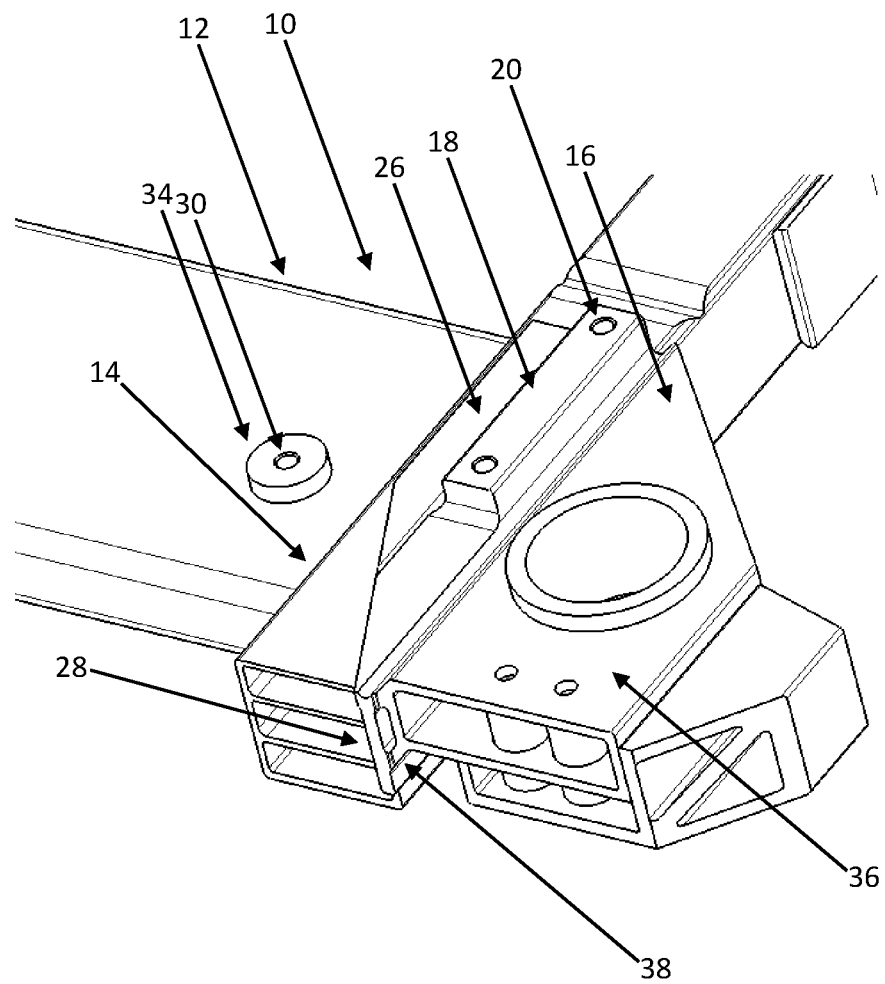
FIG. 1 is a partial perspective view of one exemplary embodiment of the (front) subframe assembly of the present disclosure, highlighting the associated (left-front) extruded corner member and shelf structure.

The present disclosure provides a subframe assembly that is adapted to receive and secure an engine or motor (i.e., a propulsion device) in a vehicle. The subframe assembly generally includes an extruded aluminum crossmember and an extruded aluminum arm member coupled to each end of the crossmember. An extruded aluminum corner member is coupled to each arm member adjacent to a corresponding intersection with the crossmember. Each corner member includes an upwardly protruding shelf structure itself defining a plurality of threaded holes adapted to receive a plurality of attachment bolts for securing the corresponding mount ((e.g., engine mount or motor mount) to the subframe assembly. This shelf structure is a solid structure that is extruded with the remainder of the corner member, providing an integrated structure that avoids the brittleness problems associated with cast components and the failure problems associated with welded components. Each corner member includes a horizontal arm disposed along an upper surface of the corresponding arm member and a vertical arm disposed along an outboard surface of the corresponding arm member. The horizontal arm comprises the upwardly protruding shelf structure defining the plurality of threaded holes adapted to receive the plurality of attachment bolts for securing the corresponding engine mount or motor mount to the subframe assembly. The crossmember defines one or more additional threaded holes at each end adapted to receive a corresponding one or more additional attachment bolts for securing the corresponding engine mount or motor mount to the subframe assembly. Additional crossmembers may be utilized and, again, each of the crossmembers, arm members, and corner members may be extruded structures, with the uninterrupted length of the arm members being maximized. It should be noted that a front subframe assembly and front engine mounts or motor mounts are the general focus of the present disclosure, however the principles thereof apply equally to rear engine mounts or motor mounts and/or a rear subframe assembly, when applicable.

This arrangement allows the mounts (i.e., engine mounts or motor mounts) to be assembled from above, providing ergonomic advantages, while eliminating the use of longer bolts and threaded sleeves within the arm members and corner members. The use of four threaded holes integrated into the front corner extrusions and only two threaded sleeves in the front crossmember provide design freedom in the size and section of the elongate extruded arms members. The sleeves and associated welds in the arm members and corner members are eliminated or reduced, as well as protrusion of the sleeves, welds, washers, and bolt heads beneath (or above) the arm members, which could amount to 20-30 mm in total. Quality issues associated with thread brakes, weld distortions, and angle mismatches are also eliminated. The use of extruded arm and corner members provides high strength and ductility for load absorption, especially when aluminum is used, such that undesirable bending and stack-up are avoided in a crash. This prevents the subframe assembly from undesirably detaching from the vehicle.

Referring now specifically to FIG. 1, in one exemplary embodiment, the subframe assembly 10 of the present disclosure includes a crossmember 12, which may be an extruded metal (e.g., aluminum) structure, and an arm member 14, which may also be an extruded metal (e.g., aluminum) structure, coupled to each end of the crossmember 12. By way of example, two crossmembers 12 and two arm members 14 may form a generally rectangular frame structure, which may include other spanning members that provide the frame structure with structural integrity and stability. A corner member 16, which may further be an extruded metal (e.g., aluminum) structure, is coupled to each arm member 14 adjacent to a corresponding intersection with the crossmember 12. In the exemplary embodiment illustrated, at least the arm members 14 are rectangular extruded structures including internal reinforcement ribs. The crossmember 12 is a rectangular extruded structure as well, and the crossmember(s) 12 is/are welded or otherwise affixed to the arm members 14. The use of extruded aluminum structures provides desired ductility and strength in the event of a crash, while keeping weight to a minimum.

Each corner member 16 includes an upwardly protruding shelf structure 18 that defines a plurality of threaded holes 20 adapted to receive a plurality of attachment bolts 22 (FIG. 4) for securing a corresponding engine mount or motor mount 24 (FIGS. 4 and 5) to the subframe assembly 10. The shelf structure 18 is a prismatic structure (or a plurality of adjacent prismatic structures) that is/are preferably solid. Alternatively, the prismatic structure(s) may be hollow and include(s) threaded internal sleeves that form the plurality of threaded holes 20, although this compromises the desired manufacturing simplicity somewhat. In one exemplary embodiment, the top surface of the shelf structure 18 is 25-35 mm above the top surface of the associated arm member 14, providing adequate purchase for the associated bolts 22. Each shelf structure 18 may, for example, be welded or otherwise secured directly to the top surface of the associated arm member 14. Functionally, the shelf structures 18 provide raised points of attachment for the engine mounts or motor mounts 24 such that the associated attachment bolts 22 do not have to engage sleeves or the like disposed through the arm members 14. As is illustrated in FIG. 2, the shelf structure 18 may include an inboard radius 19 at the base thereof, where the base meets the arm member 14 or the remainder of the corner member 16.

Figure 2:
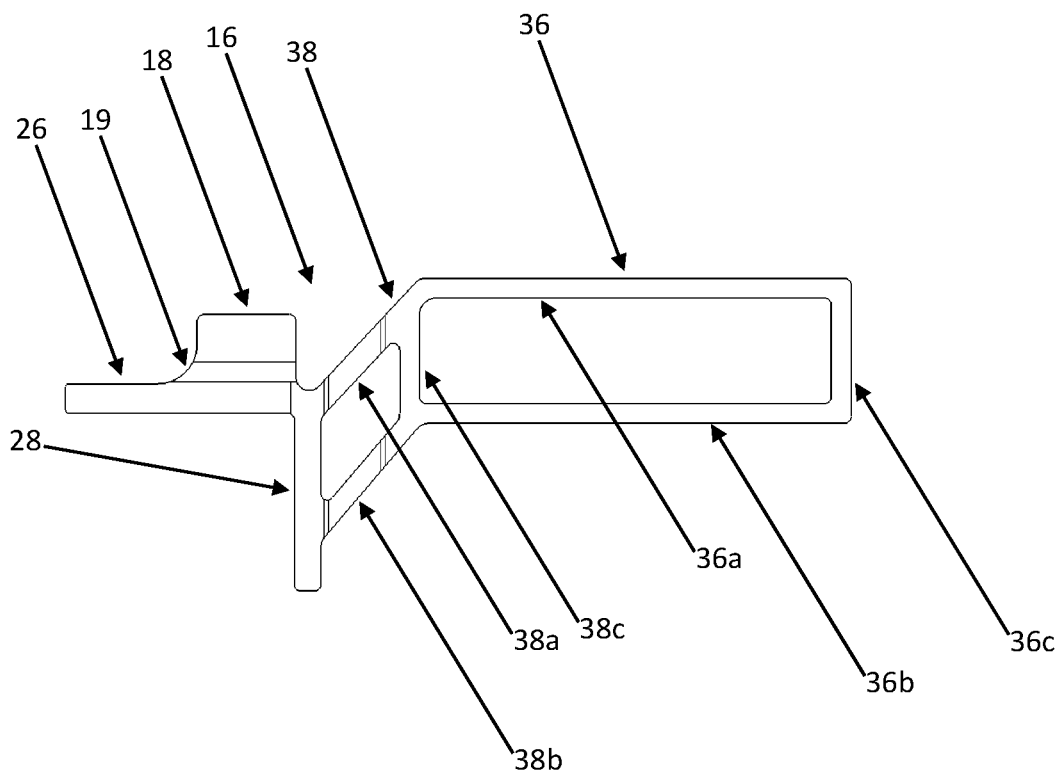
FIG. 2 is a cross-sectional end view of one exemplary embodiment of the (left-front) extruded corner member (or corner extrusion) of the present disclosure, highlighting the associated shelf structure.
Figure 3:
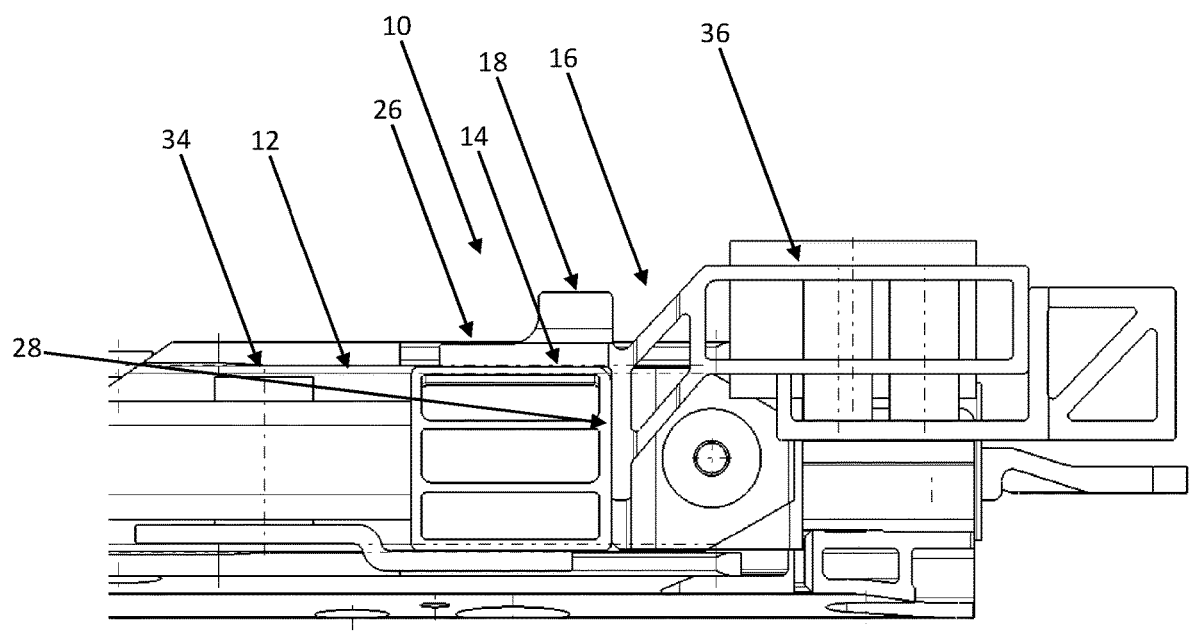
FIG. 3 is a partial cross-sectional end view of one exemplary embodiment of the (front) subframe assembly of the present disclosure, again highlighting the associated (left-front) extruded corner member and shelf structure.

Referring now specifically to FIGS. 1-3, in a preferred embodiment, each corner member 16 includes a horizontal arm 26 disposed along an upper surface of the corresponding arm member 14 and a vertical arm 28 disposed along an outboard surface of the corresponding arm member 14. The horizontal arm 26 and the vertical arm 28 can be welded or otherwise affixed to the associated arm member surfaces or, as described herein above, the horizontal arm 26 and the vertical arm 28 can be integrally formed with the associated arm member 14. The horizontal arm 26 includes the upwardly protruding shelf structure 18 defining the plurality of threaded holes 20 adapted to receive the plurality of attachment bolts 22 (FIG. 4) for securing the corresponding engine mount or motor mount 24 (FIGS. 4 and 5) to the subframe assembly 10. The crossmember 12 also defines one or more additional threaded holes 30 at each end adapted to receive a corresponding one or more additional attachment bolts 32 (FIG. 4) for securing the corresponding engine mount or motor mount 24 to the subframe assembly 10. Here, the threaded holes 30 of the crossmember 12 are formed via traditional sleeves 34 disposed and welded in/through the crossmember 12. As alluded to herein above, the holes 20 formed in the shelf structure 18 are preferably disposed above the surface level of the holes 30 formed in the crossmember 12, to match the various offset retention arms of the various engine mounts or motor mounts 24. Again, all components described herein may be manufactured from a metal, such as aluminum, providing the desired strength and ductility.

The subframe assembly 10 also includes an additional crossmember (not illustrated) coupled between the arm members 14, rounding out the resulting frame structure. Again, each of the arm members 14 is preferably an elongate extruded structure. Each of the corner members is preferably also an extruded structure. The horizontal arm 26 and the vertical arm 28 of each corner member 16 are optionally welded or otherwise affixed to the corresponding upper surface and outboard surface of the corresponding arm member 14. In the exemplary embodiment illustrated, the horizontal arm 26 is cut-away in front of the shelf structure 18 for weight savings purposes. Alternatively, the horizontal arm 26 and the vertical arm 28 of each corner member 16 are integrally formed with the corresponding upper surface and outboard surface of the corresponding arm member 14.

Each corner member 16 further includes an extruded horizontal planar member 36 coupled to the corresponding vertical arm 28 and/or the outboard surface of the associated arm member 14. The horizontal planar member 36 is coupled to the corresponding vertical arm 28 and/or the outboard surface of the associated arm member 14 by an angled arm member 38. This angled arm member 38 is configured such that the top surface of the horizontal planar member 36 sits above the top surface of the associated arm member 14 and shelf structure 18. It will be readily apparent to those of ordinary skill in the art that the relative configuration, position and orientation of the various components of the subframe assembly 10 can be varied to conform to the setup of a particular vehicle, as desired. The horizontal planar member 36 may define any number and arrangement of other holes, ports, and apertures to accommodate a variety of additional coupled components and the like. In the exemplary embodiment illustrated, the back edge of each horizontal planar member 36 is angled for weight savings and to fit within vehicle space constraints.

Figure 4:
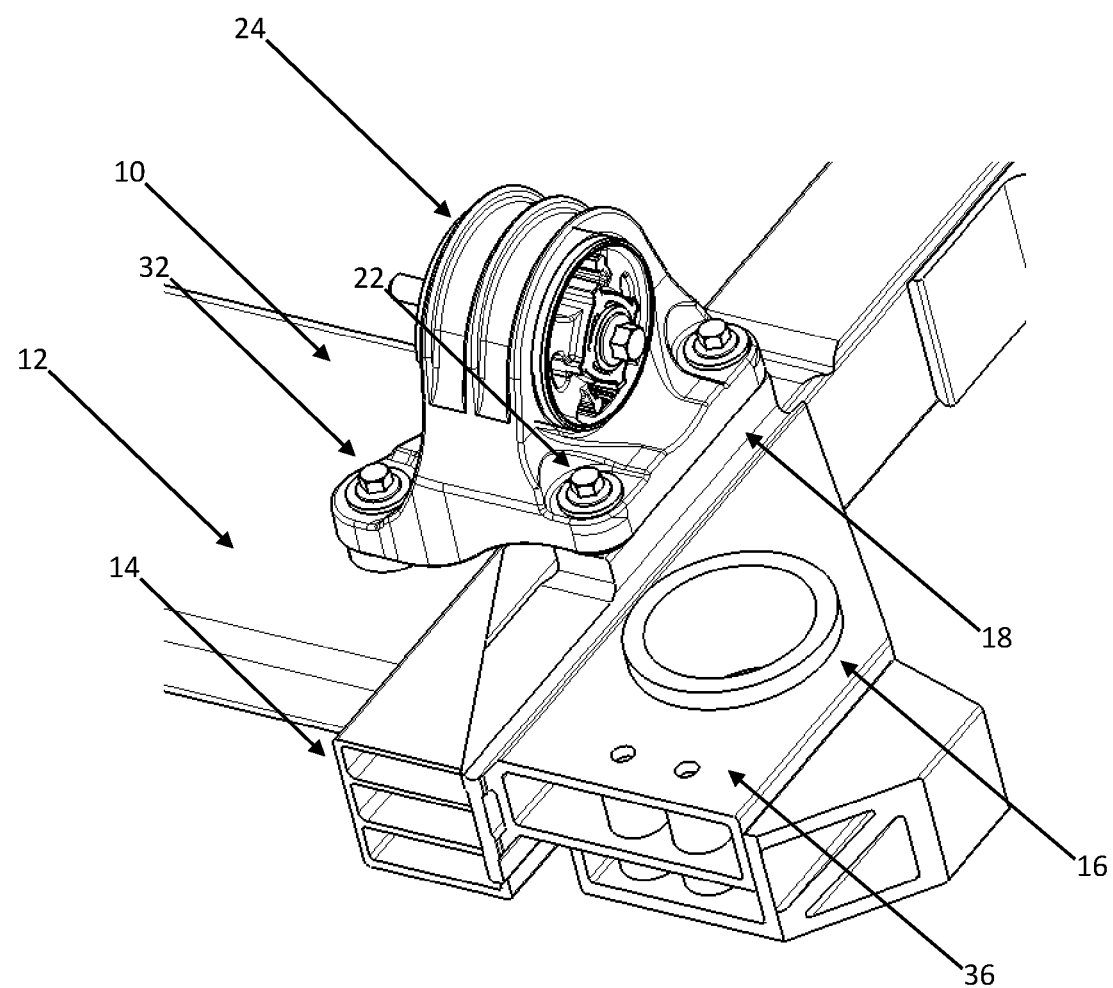
FIG. 4 is a partial perspective view of one exemplary embodiment of the (front) subframe assembly of the present disclosure with a (left-front) engine mount or motor mount secured to the shelf structure and crossmember from above using bolts.

Referring specifically to FIG. 2, in one exemplary embodiment, each corner member 16 includes a horizontal arm 26 that is disposed substantially perpendicularly to the vertical arm, to correspond to the substantially perpendicular top and outboard surfaces of the associated arm member 14 (FIGS. 1, 3, and 4). This conformal arrangement allows the corner member 16 to be securely welded or otherwise affixed to the arm member 14. A bottom arm is generally not required or used to couple the corner member 16 to the arm member 14 as a c-shaped connection would be formed and create potential manufacturing tolerance and fit issues. However, this possibility is not excluded. The horizontal planar member 36 and angled arm member 38 include associated top and bottom members 36a, 36b, 38a, and 38b, respectively—forming a unitary prismatic structure. The horizontal planar member 36 may be closed by a vertical wall 36c and separated from the angled arm member 38 by another vertical wall 38c. It will be readily apparent to those of ordinary skill in the art that any number or configuration of other internal structures may be provided as well. During manufacturing, the horizontal arm 26 of each corner member 16 is typically first welded to the top surface of the associated arm member 14. The vertical arm 28 of the corner member 16 is then pressed into contact with the outboard surface of the arm member 14 and welded, thereby securing the corner member 16 to the arm member 14 with the shelf structure 18 in the appropriate position and orientation.

FIG. 4 is a partial perspective view of one exemplary embodiment of the (front) subframe assembly 10 of the present disclosure with a (left-front) engine mount or motor mount 24 secured to the shelf structure 18 and crossmember 12 from above using bolts 22 and 32. As alluded to herein above, the holes 20 (FIG. 1) formed in the shelf structure 18 are preferably disposed above the surface level of the corresponding hole 30 (FIG. 1) formed in the crossmember 12, to match the various offset retention arms of the engine mount or motor mount 24. Further, the top surface of the horizontal planar member 36 generally sits above the top surface of the associated arm member 14 and shelf structure 18, which sits above the top surface of the crossmember 12. In this preferred embodiment, the shelf structure 18 is integrally formed with the corner member 16. With the bolts 22 and 32, appropriate washers and/or vibration dampers may also be utilized.

Figure 5:
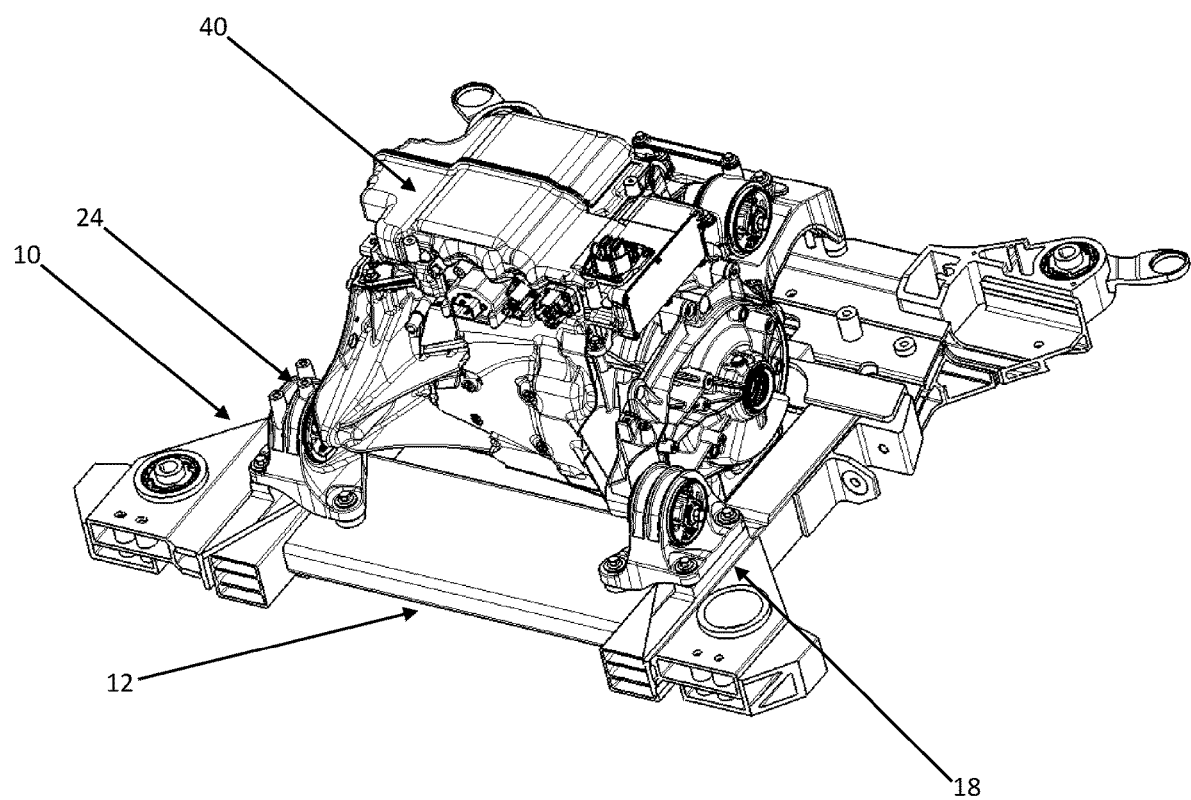
FIG. 5 is a perspective view of one exemplary embodiment of the (front) subframe assembly of the present disclosure with four motor mounts and a motor secured to the shelf structures and crossmembers from above using bolts.

FIG. 5 is a perspective view of one exemplary embodiment of the (front) subframe assembly 10 of the present disclosure with four motor mounts 24 and a motor 40 secured to the shelf structures 18 and crossmembers 12 from above using bolts (not illustrated).

Thus, referring to FIGS. 1-5, the present disclosure provides a subframe assembly 10 that is adapted to receive and secure an engine or a motor 40 in a vehicle. The subframe assembly 10 generally includes an extruded aluminum crossmember 12 and an extruded aluminum arm member 14 coupled to each end of the crossmember 12. An extruded aluminum corner member 16 is coupled to each arm member 14 adjacent to a corresponding intersection with the crossmember 12. Each corner member 16 includes an upwardly protruding shelf structure 18 itself defining a plurality of threaded holes 20 adapted to receive a plurality of attachment bolts 22 for securing the corresponding engine mount or motor mount 24 to the subframe assembly 10. This shelf structure 18 is a solid structure that is extruded with the remainder of the corner member 16, providing an integrated structure that avoids the brittleness problems associated with cast components and the failure problems associated with welded components. Each corner member 16 includes a horizontal arm 26 disposed along an upper surface of the corresponding arm member 14 and a vertical arm 28 disposed along an outboard surface of the corresponding arm member 14. The horizontal arm 26 comprises the upwardly protruding shelf structure 18 defining the plurality of threaded holes 20 adapted to receive the plurality of attachment bolts 22 for securing the corresponding engine mount or motor mount 24 to the subframe assembly 10. The crossmember 12 defines one or more additional threaded holes 32 at each end adapted to receive a corresponding one or more additional attachment bolts for securing the corresponding engine mount or motor mount 24 to the subframe assembly 10. Additional crossmembers (not illustrated) may be utilized and, again, each of the crossmembers 12, arm members 14, and corner members 16 may be extruded structures, with the uninterrupted length of the arm members 14 being maximized. It should be noted that a front subframe assembly 10 and front engine mounts or motor mounts 24 are the general focus of the present disclosure, however the principles thereof apply equally to rear engine mounts or motor mounts 24 and/or a rear subframe assembly 10, when applicable.

Again, this arrangement allows the engine mounts or motor mounts 24 to be assembled from above, providing ergonomic advantages, while eliminating the use of longer bolts and threaded sleeves within the arm members 14 and corner members 16. The use of four threaded holes 20 integrated into the front corner extrusions 16 and only two threaded sleeves 34 in the front crossmember 12 provide design freedom in the size and section of the elongate extruded arms members 14. The sleeves and associated welds in the arm members 14 and corner members 16 are eliminated or reduced, as well as protrusion of the sleeves, welds, washers, and bolt heads beneath (or above) the arm members, which could amount to 20-30 mm in total. Quality issues associated with thread brakes, weld distortions, and angle mismatches are also eliminated. The use of extruded arm 14 and corner members 16 provides high strength and ductility for load absorption, especially when aluminum is used, such that undesirable bending and stack-up are avoided in a crash. This prevents the subframe assembly 10 from undesirably detaching from the vehicle.

Although the present disclosure is illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following non-limiting claims for all purposes.

What is claimed is:
1. A subframe assembly for a vehicle, comprising:
a crossmember;
an arm member coupled to each end of the crossmember; and
a corner member coupled to each arm member adjacent to a corresponding intersection with the crossmember, wherein each corner member comprises an upwardly protruding shelf structure defining a threaded hole adapted to receive an attachment bolt for securing a corresponding mount to the subframe assembly;

wherein each corner member comprises a horizontal arm disposed along an upper surface of the corresponding arm member and a vertical arm disposed along an outboard surface of the corresponding arm member, and wherein the horizontal arm comprises the upwardly protruding shelf structure defining the threaded hole.

2. The subframe assembly of claim 1, wherein the horizontal arm and the vertical arm of each corner member are welded to the corresponding upper surface and outboard surface of the corresponding arm member, respectively.

3. The subframe assembly of claim 1, wherein the horizontal arm and the vertical arm of each corner member are coupled to the corresponding upper surface and outboard surface of the corresponding arm member, respectively.

4. The subframe assembly of claim 1, wherein each corner member comprises a horizontal planar member coupled to the corresponding vertical arm.

5. The subframe assembly of claim 4, wherein the horizontal planar member is coupled to the corresponding vertical arm by an intervening angled arm member.

6. The subframe assembly of claim 1, wherein the crossmember defines a threaded hole at each end adapted to receive a corresponding second attachment bolt.

7. The subframe assembly of claim 1, further comprising a second crossmember coupled between the arm members.

8. The subframe assembly of claim 1, wherein each of the arm members is an elongate extruded structure and each of the corner members is an extruded structure.

9. A corner member for a subframe assembly for a vehicle, comprising:
an upwardly protruding shelf structure defining a threaded hole adapted to receive an attachment bolt for securing a corresponding mount to the subframe assembly; and
a horizontal arm adapted to be disposed along an upper surface of a corresponding arm member of the subframe assembly and a vertical arm adapted to be disposed along an outboard surface of the corresponding arm member of the subframe assembly, wherein the horizontal arm comprises the upwardly protruding shelf structure defining the threaded hole.

10. The corner member of claim 9, wherein the horizontal arm and the vertical arm are adapted to be welded to the corresponding upper surface and outboard surface of the corresponding arm member, respectively.

11. The corner member of claim 9, wherein the horizontal arm and the vertical arm are adapted to be coupled to the corresponding upper surface and outboard surface of the corresponding arm member, respectively.

12. The corner member of claim 9, further comprising a horizontal planar member coupled to the vertical arm.

13. The corner member of claim 12, wherein the horizontal planar member is coupled to the vertical arm by an intervening angled arm member.

14. The corner member of claim 9, wherein the subframe assembly to which the corner member is adapted to be coupled includes a crossmember coupled between arm members of the subframe assembly that defines a threaded hole at each end adapted to receive a corresponding second attachment bolt.

15. The corner member of claim 14, wherein the subframe assembly to which the corner member is adapted to be coupled further includes a second crossmember coupled between the arm members.

16. The corner member of claim 14, wherein each of the arm members is an elongate extruded structure and the corner member is an extruded structure.

17. A vehicle, comprising:
a propulsion device;
mounts coupled to the propulsion device; and
a subframe assembly, comprising:
an crossmember;
an extruded arm member coupled to each end of the crossmember; and
an extruded corner member coupled to each arm member adjacent to a corresponding intersection with the crossmember, wherein each corner member comprises a horizontal arm disposed along an upper surface of the corresponding arm member and a vertical arm disposed along an outboard surface of the corresponding arm member, wherein the horizontal arm comprises an upwardly protruding shelf structure defining a threaded hole adapted to receive an attachment bolt for securing a corresponding mount to the subframe assembly, and wherein each corner member comprises a horizontal planar member coupled to the corresponding vertical arm.

18. The vehicle of claim 17, wherein the crossmember defines a threaded hole at each end adapted to receive a corresponding second attachment bolt.

* * * * *